United States Patent [19]

Priest et al.

[11] Patent Number: 4,699,420
[45] Date of Patent: Oct. 13, 1987

[54] PREFORMED ORNAMENTAL CAP OR AUTOMOTIVE VEHICLE

[75] Inventors: Scott J. Priest; Billy J. Barton, both of Royal Oak; Ronald C. Johnson, Rochester, all of Mich.

[73] Assignee: Chrysler Motors Corporation, Highland Park, Mich.

[21] Appl. No.: 902,900

[22] Filed: Sep. 2, 1986

[51] Int. Cl.⁴ .............................................. B62D 25/06
[52] U.S. Cl. .................................... 296/210; 296/31 P
[58] Field of Search .................... 296/210, 136, 31 P

[56] References Cited

U.S. PATENT DOCUMENTS

| | | | |
|---|---|---|---|
| 2,674,488 | 4/1954 | Lyijynen et al. | 296/210 |
| 3,328,073 | 6/1967 | Einhorn | 296/136 |
| 3,926,471 | 12/1975 | Nadasi et al. | 296/210 |
| 4,154,473 | 5/1975 | Alexander et al. | 296/210 |
| 4,218,088 | 8/1980 | Swindlehurst | 296/210 |
| 4,239,279 | 12/1980 | Gonas | 296/210 |

*Primary Examiner*—Robert R. Song
*Attorney, Agent, or Firm*—Edward A. Craig

[57] ABSTRACT

A preformed ornamental cap of the type commonly referred to as a vinyl roof is provided for mounting on the roof of a vehicle. The cap, which has a top wall, side walls and a rear wall, is fixedly mounted to the vehicle in the areas of the top top and side walls. The rear wall of the cap is provided with tongues which engage U-shaped spring clips on the vehicle body for securement of the cap rear wall to the vehicle.

8 Claims, 9 Drawing Figures

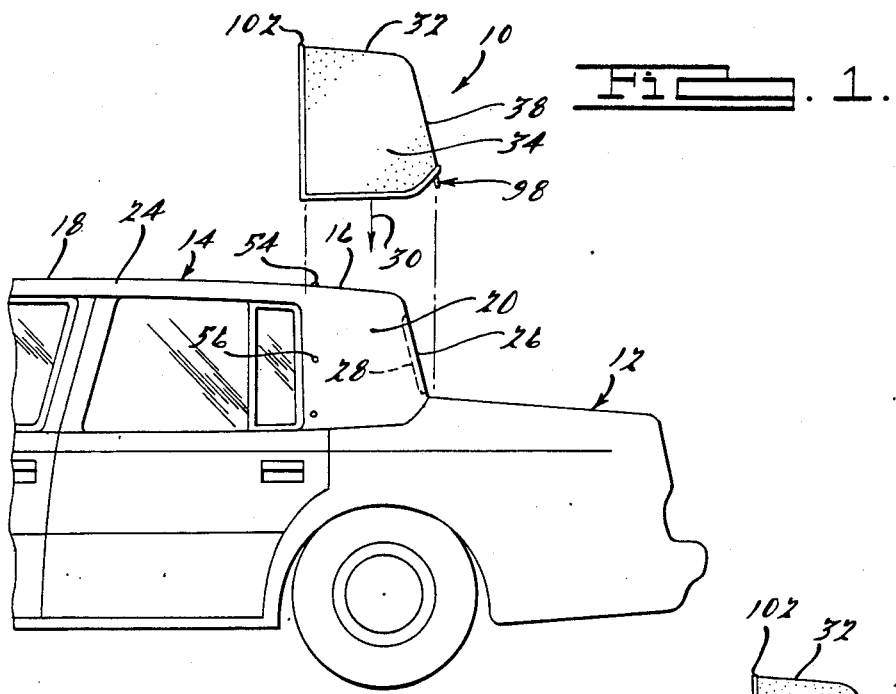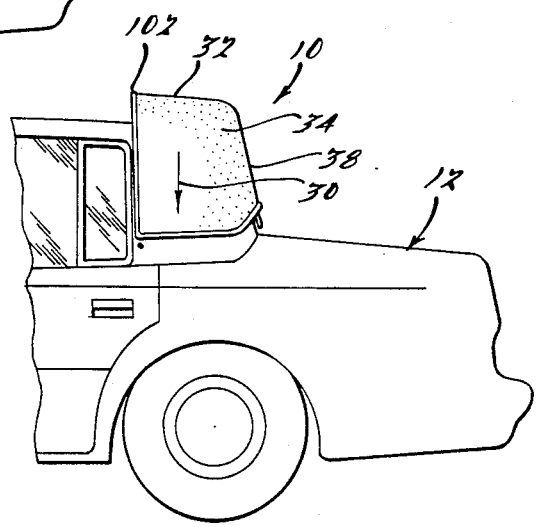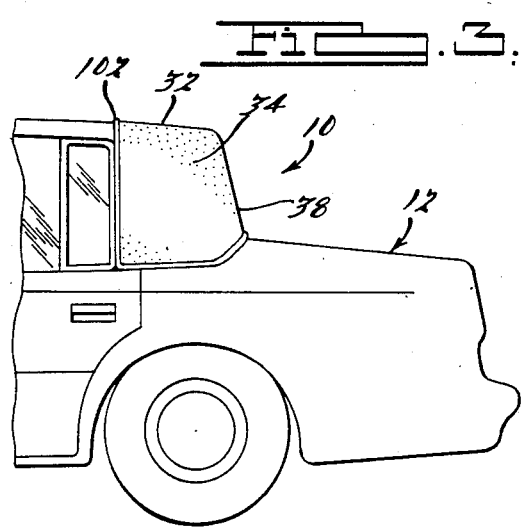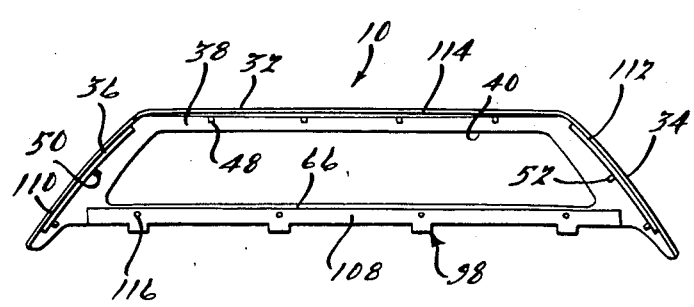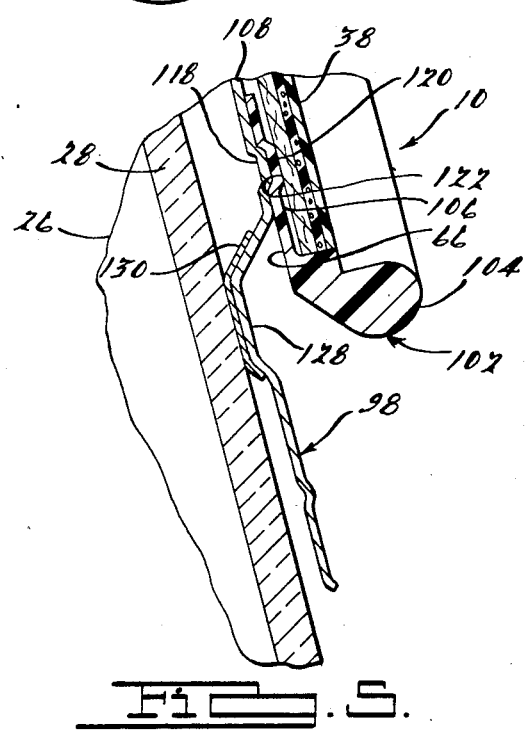

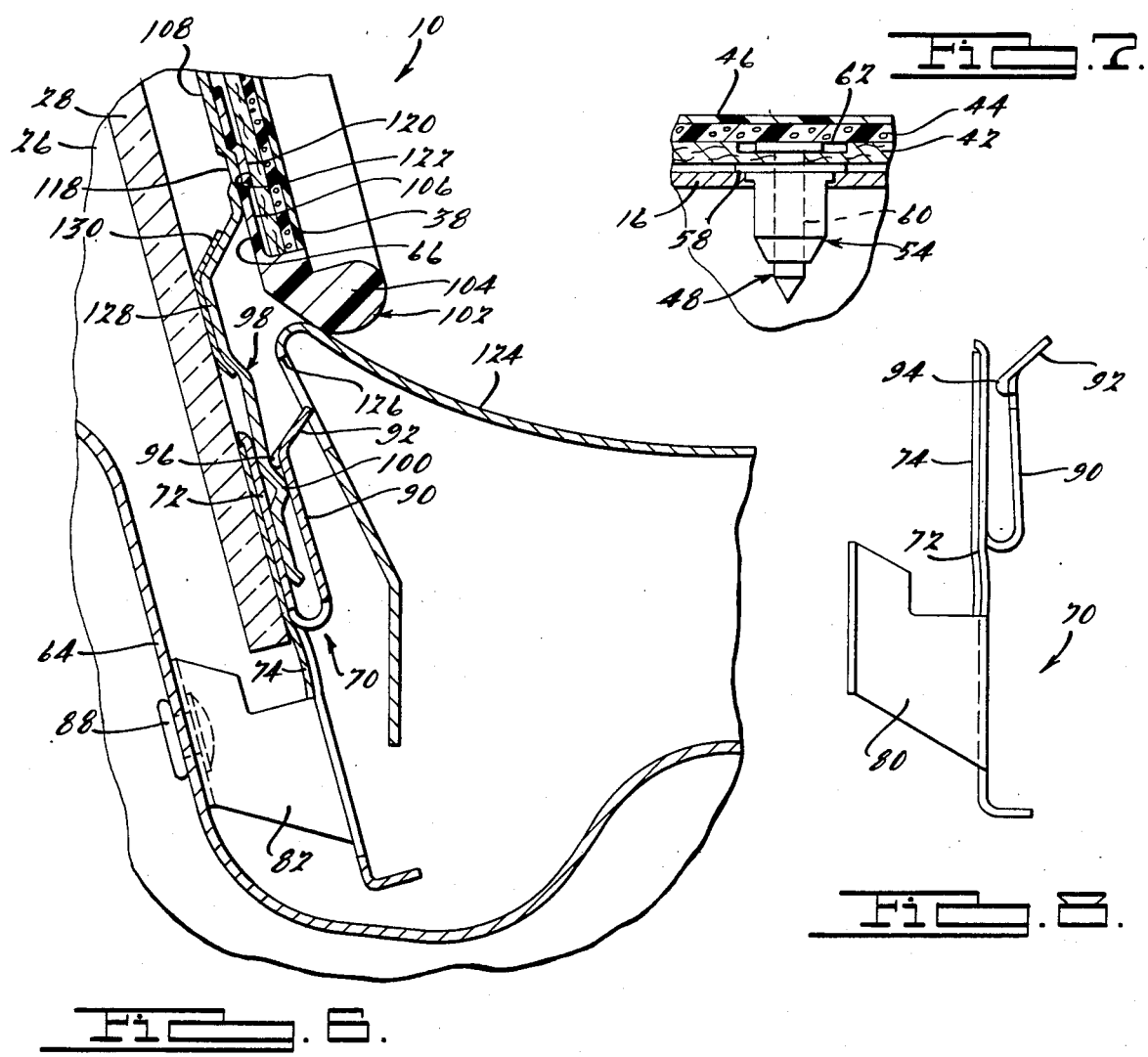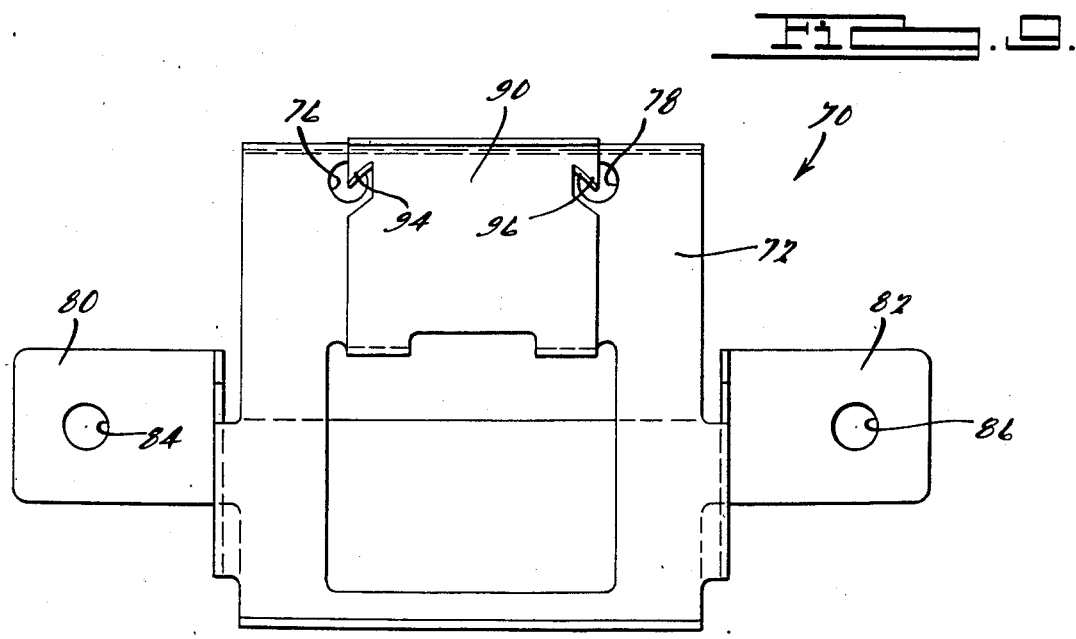

PREFORMED ORNAMENTAL CAP OR AUTOMOTIVE VEHICLE

BACKGROUND OF THE INVENTION

Ornamental caps for automotive vehicles, commonly referred to as vinyl roofs, have become increasingly popular. The construction of such ornamental caps normally comprises a form fitting fiberglass shell which is received on the top of the vehicle. A layer of foam padding is provided on the exterior surface of the shell and a sheet of plastic material, normally polyvinyl, is secured over the layer of foam.

Conventionally, such ornamental caps are factory mounted on an assembly line which is separate from the main assembly line. The process involves considerable hand labor. First the fiber glass shell is set in place on the vehicle. Then the layer of foam padding is laid over the fiber glass shell and hand trimmed to fit. The sheet of polyvinyl is then laid over the foam and hand trimmed to fit. There is considerable tucking of the foam and vinyl to secure it in place. The overall assembly is held in place by means of moldings which are fixedly secured to the vehicle around the peripheral outer edges of the ornamental cap. Such caps are normally either relatively short structure provided on the rear of the roof or roof covers including the rear portion and a portion extending forwardly covering either all or a portion of the roof. As used in the present application, the term "cap" is intended to refer to either ornamental caps which cover the entire the roof or which cover only a portion of the roof.

It has long been desired to eliminate the custom hand work involved in mounting ornamental caps. The obvious solution is to provide a preformed ornamental cap which need only be dropped onto the vehicle and secured in place. Such an operation can easily be carried out on the main assembly line of an automotive factory or can be easily done by customizers in their shops without special expertise or equipment. The problem which has been encountered when it has been attempted to develop a preformed ornamental cap has been the dimensional irregularities inherent in the sheet metal construction of vehicles. It will be appreciated that the fit and finish of an ornamental cap must be of the highest level otherwise customers will reject the product.

It has been learned in accordance with the present invention that a large portion of a vehicle roof is sufficiently dimensionally stabilized so as to permit preforming of ornamental caps and fixedly fastening a portion of the cap in place by means of relatively permanent conventional fixed fasteners such as bolts, plastic nails or the like. This portion of the roof comprises substantially the entire top wall of the roof and the short side wall portions which extend from the center of the vehicle and the relatively longer side wall portions at the rear of the vehicle. However, the area defined by the downwardly extending rear wall of the vehicle which includes the rear window, cannot be depended upon to always be dimensionally accurate. It will be appreciated in this context that the dimensional accuracy referred to is only small fractions of an inch. The reason for this resides in the constructional nature of the rear roof wall. It involves parallelism of the sides of the vehicle and the relatively large space defined by the width and breadth of the rear wall. It is therefore not possible to reproducibly provide fixed fastening means on the rear wall. Such fastening means inherently involve providing an opening of some sort in the vehicle which may be filled with a nut or the like which will receive a bolt, plastic nail or other fastener element. The mating fastening elements provided on the rear wall and the cap would not always be in alignment and therefore in some cases would not match with the consequent effect of preventing securement of the cap to the vehicle.

In accordance with the present invention, fastening means are provided to fixedly connect the cap top wall and cap side walls to the vehicle top and side walls while clip means are provided on the vehicle back wall and cap back wall. These clip means do not require absolute alignment in order to function and therefore eliminate the problem above referred to.

SUMMARY OF THE INVENTION

A preformed ornamental cap is mounted on the roof of an automotive vehicle. The roof of the automotive vehicle includes a top wall, a pair of opposed, downwardly depending side walls integral with the top wall, a downwardly depending rear wall integral with the top wall and side walls, and a rear window in the rear wall.

The ornamental cap, which is preformed, is mounted on the roof. The cap has an internal contour complementary with the roof. The cap also includes a top wall, a pair of opposed, downwardly depending side walls integral with the cap top wall, a downwardly depending rear wall integral with the cap top wall and side walls, and a rear window opening in the cap rear wall which registers with the vehicle rear window.

Fastening means fixedly connect the cap top wall to the vehicle top wall and the cap side walls to the vehicle side walls.

The vehicle includes panel structure at the base of the vehicle rear wall. The cap rear wall has an inner surface beneath the rear window opening. U-shaped spring clip means are provided on one of the panel structure and said inner surface. Tongue means are provided on the other of the panel structure and said inner surface. The tongue means is received within the U-shaped spring clip means to secure the cap rear wall to the vehicle. Preferably, the U-shaped spring clip means comprises a plurality of spaced apart U-shaped spring clips and the tongue means comprises a plurality of spaced apart tongues in alignment with U-shaped spring clips. Preferably, the U-shaped spring clip means is provided on the panel structure and the tongue means is provided on said inner surface.

Each spring clip has a yieldable spring arm with a tang means thereon. Each tongue has a projection thereon. The projection passes by the tang means with the arm flexing to permit such passage when the tongue is received in the spring clip. Engagement of the tang means with the projection restrains removal of the tongue from the spring clip.

A flexible welt is secured to the lower edge of the cap rear wall. The welt overlies the seam defined by the lower edge of the cap rear wall and the vehicle body. Preferably, the flexible welting extends around the entire outer peripheral edge of the cap and overlies the seam defined by the outer peripheral edge of the cap and the vehicle body.

The tongue means preferably includes a raised portion on the inner surface thereof which slides against the vehicle rear window when the cap is mounted on the vehicle and thereby acts to guide the tongue means during such mounting.

DESCRIPTION OF THE DRAWINGS

FIG. 1 is a side elevational view of the rear portion of a car with the ornamental cap of the present invention illustrated in position prior to mounting on the car roof;

FIG. 2 is a view similar to FIG. 1 with the ornamental cap partially mounted on the car roof;

FIG. 3 is a view similar to FIG. 1 with the ornamental cap completely mounted on the car roof;

FIG. 4 is an elevational view of the roof cap viewing the interior thereof and with the welt not mounted thereon;

FIG. 5 is a partial sectional view illustrating the lower rear potion of the vehicle rear window and ornamental cap as the cap is being mounted as illustrated in FIG. 2;

FIG. 6 is a view similar to FIG. 5 illustrating in section portions of the cap in the fully mounted position as shown in FIG. 3;

FIG. 7 is a sectional view illustrating one of the fastening elements used to fixedly secure the top wall and the side walls of the cap to the vehicle;

FIG. 8 is a side elevational view of one of the U-shaped spring clips used at the base of the rear wall of the vehicle top; and FIG. 9 is a front elevational view of the U-shaped spring clip of FIG. 8.

DESCRIPTION OF THE PREFERRED EMBODIMENT

Referring to FIGS. 1-4, it will be noted that an ornamental cap 10 is provided for a car 12. The cap 10 is relatively short and is designed to cover only the rear portion of the car roof structure. However, within the scope of the invention, it will be appreciated that the cap 10 may have a forwardly extending portion to cover the entire roof structure of the car 12 in conventional fashion. The term "cap" is intended to encompass both longer and shorter cap structures.

The roof structure of the car 12 encompasses the top wall 14, only the rearmost portion 16 of which is covered by the cap 10. The forward portion 18 may also be covered if desired. The roof structure also includes a conventional pair of opposed downwardly depending side walls 20 (one shown) which are integral with the top wall 14. Again, only the rearmost portion 22 of the sidewalls are covered by the cap 10. The forward relatively narrow sidewall portions 24 may also be covered if desired. The roof structure is completed by downwardly depending rear wall 26 which is integral with the top wall 14 and side walls 20. The entire rear wall 26 is covered by the cap 10. The rear wall 26 includes the usual rear window 28 (FIG. 1).

The ornamental cap 10, which is preformed, is mounted on the roof structure of the car 12 as illustrated in FIGS. 1-3. The cap 10 is first lowered from the position illustrated in FIG. 1 down onto the roof of the car 12 in the direction of arrow 30. It is lowered onto the roof as shown in FIG. 2. The sides of the cap 10 may be flexed outwardly to accommodate passing over the roof structure. Finally, as shown in FIG. 3, the cap 10 is fully mounted on the roof of the car 12. The cap 10 has an internal contour which is complementary with the roof structure of the car 12. The structure of the cap 10, as with the roof of the car 12, also includes a top wall 32 and a pair of opposed downwardly depending side walls 34, 36 which are integral with the top wall 32. A downwardly depending rear wall 38 is integral with the cap top wall 32 side walls 34, 36. A rear window opening 40 is provided in the-rear wall 38. The opening 40 registers with the vehicle rear window 28 when the cap 10 is fully mounted as shown in FIG. 3.

The structure of the cap 10 is conventional. As will be noted in FIG. 7, it includes a molded fiber glass inner shell 42 which is overlaid with foam padding 44. Overlying the foam padding 44 is a fabric-like sheet of material 46, normally of polyvinyl.

The cap 10 is secured to the car top wall portion 16 and side walls 20 by means of fasteners which fixedly connect the cap top wall 32 to the car top wall portion 16 and the cap side walls 34, 36 to the car side walls 20.

As will be noted in FIGS. 1, 4 and 7, the fastening means comprises projecting fastening elements 48 along the forward edge of the cap top wall 32, illustrated as four in number, and projecting fasteners 50, 52 on the forward edges of the cap side walls 34, 36 illustrated as two in number for each side wall. The top and side walls of the roof have mating nut structures 54, 56 as will be noted in FIG. 1. The nut structures illustrated are called "barrel nuts" and are conventional. As will be seen in FIG. 7, the nut structures include a cylindrical portion having a central opening therethrough. They are mounted, illustratively on the top wall portion 16, through openings in the wall and held in place by means of a flange structure 58. The projecting fasteners illustrated are termed "plastic nails". These have an extended nail like shank portion 60 which is fixedly received in the nut and a head 62 which is mounted on the fiber glass shell in a recess thereof. The foam padding and sheet material overlie the head 62 so as to hide the head from external view. The same fasteners may be used to secure any cap portion which extends forwardly of that shown to cover the remaining portions of the roof, if desired.

The structure for securing the cap rear wall 38 to the car will now be described. As will be noted in FIG. 6, the car 12 includes a panel structure 64 at the base of the vehicle rear wall 26. The cap rear wall 38 has an inner surface 66 beneath the rear window opening 40. U-shaped spring clip means are provided on one of the panel structure 64 and the inner surface 66. Tongue means are provided on the other of the panel structure 64 and the inner surface 66. The tongue means are received within the U-shaped spring clip means to secure the base of the cap rear wall 38 to the car 12. Preferably, the clip means is secured to the panel structure 64 and the tongue means is secured to the inner surface 66, as shown.

The U-shaped spring clip means comprises a plurality of spaced apart U-shaped spring clips 70. As will be noted in FIGS. 6, 8 and 9, each spring clip comprises a rear wall 72 which is reinforced by a panel 74 welded thereto at 76, 78 as shown in FIG. 9. A pair of mounting bracket elements 80, 82 extend from the rear wall 72 and have openings 84, 86. The panel structue 64 has similar openings. Fastening elements 88, representatively pop rivets, extend through these openings to secure the spring clips in place on the panel structure 64. A yieldable forward spring arm 90 is formed out of the material of the rear wall 72. The arm 90 terminates in a guide flange 92. Tangs 94, 96 are formed in the upper end of the spring arm 90.

The tongue means, as best shown in FIGS. 4, 5 and 6, comprises a plurality of spaced apart tongues 98, illustratively four in number to mate with four spring clips which are in alignment therewith. The tongues 98 are relatively broad and long so as to compensate for minor lateral and vertical displacement of the tongues with respect to the spring clips to thereby always mate with the spring clips even if there is some dimensional irregularity between the cap 10 and roof structure of the car 12.

Each tongue has a projection structure 100 thereon. This projection structure passes by the tangs 94, 96 on the spring clips upon insertion of the tongues into the spring clips, the arm 90 flexing to permit such passage when a tongue is received in a spring clip. As best shown in FIG. 6, the tangs will engage the projection when forces are applied to the remove the tongues from the spring clips thereby restraining such removal. Basically, the tongues are held in the spring clips by the action of friction.

A flexible welt 102 extends around the entire outer peripheral edge of the cap 10. Provision of the welt 102 is particularly important along the lower edge of the cap rear wall 38.

The welt 102 overlies the seam defined by the outer peripheral edge of the cap 10 into the vehicle body. The welt 102 serves an ornamental purpose as well as a sealing purpose. The welt 102 and the structure for mounting it are best shown in FIGS. 4–6. As will be noted, the welt comprises a bead portion 104 from which extends a flange 106. The flange 106 is inserted in the space between the inner surface of the marginal edge portions of the cap 10 and retainer strips 108, 110, 112, 114. The strip 108 extends between and is integral with the tongue means. The strips are secured to the cap 10 as by pop rivets 116, the heads of which are preferably positioned beneath the layer of foam and sheet of vinyl on the cap 10 in the manner illustrated in FIG. 7 so as not to be externally visible.

As will be noted in FIGS. 5 and 6, the strips 108, 110, 112, 114, are spaced a slight distance from the inner surface of the cap 10 so as to permit insertion of the welt flange 106. An elongated projection 118 is provided on each of the strips 108, 110, 112, 114 and a mating elongated depression 120 is provided in the welt flange and a similar depression 122 is provided on the interior surface of the marginal edge portion of the cap 10 all of which interlock as shown in FIGS. 5 and 6 to thereby retain the welt in place. The welt has not been shown in FIG. 4 so as to present a clear showing of the strips 108, 110, 112, 114. However, in practice the welt 102 is mounted on the cap 10 prior to the cap being mounted on the car 12 as shown in FIGS. 1–3. Simulated stitching may be provided on the exterior surface of the welt bead 104 if desired.

As will be noted in FIG. 6, the welt bead 104 rests against structure of the car, the panel 124 shown being a portion of the deck lid. As will be noted, an opening 126 is provided in panel 124 to permit movement of the guide flange 92 upon flexing of the spring arm 90.

Referring to FIGS. 5 and 6, it will be noted that a raised portion 128 which extends laterally is provided on the tongues 98. This raised portion is reinforced by means of a metal backing 130. The raised portion 128 slides along the surface of the rear window 28 as shown in FIG. 5 as the cap 10 is pushed upon the roof of the car as shown in FIG. 2. This serves to guide the tongue means during such mounting so that the tongues will be pointed in the right direction to enter the spring clips 68.

What is claimed is:

1. In combination with an automotive vehicle including a roof having a top wall, a pair of opposed, downwardly depending side walls integral with the top wall, a downwardly depending rear wall integral with the top wall and side walls and a rear window in the rear wall, a preformed ornamental cap mounted on the roof and having an internal contour complementary with the roof and also including a top wall, a pair of opposed, downwardly depending side walls integral with the cap top wall, a downwardly depending rear wall integral with the cap top wall and side walls, and a rear window opening in the cap rear wall which registers with the vehicle rear window, fastening means fixedly connecting the cap top, wall to the vehicle top wall and the cap side walls to the vehicle side walls, the vehicle including panel structure at the base of the vehicle rear wall, the cap rear wall having an inner surface beneath the rear window opening, U-shaped spring clip means provided on one of said panel structure and said inner surface, and tongue means provided on the other of said panel structure and said inner surface, said tongue means being received within said U-shaped spring clip means to secure the base of the cap rear wall to the vehicle.

2. The structure as set forth in claim 1, further characterized in that the U-shaped spring clip means comprises a plurality of spaced apart U-shaped spring clips and the tongue means comprises a plurality of spaced apart tongues in alignment with the U-shaped spring clips, the tongues being relatively broad and long so as to compensate for minor lateral and vertical displacement and still mate with the U-shaped spring clips.

3. The structure as defined in claim 1, further characterized in that the U-shaped spring clip means is provided on said panel structure and the tongue means is provided on said inner surface.

4. Structure as defined in claim 3, further characterized in that the U-shaped spring clip means comprises a plurality of spaced apart U-shaped spring clips and the tongue means comprises a plurality of spaced apart tongues in alignment with the U-shaped spring clips, the tongues being relatively broad and long so as to compensate for minor lateral and vertical displacement and still mate with the U-shaped spring clips.

5. The structure as defined in claim 4, further characterized that each spring clip has a yieldable spring arm with a tang structure thereon, each tongue having a projection structure passing by the tang structure with the arm flexing to permit said passage when the tongue is received in the spring clip, engagement of the tang structure with the projections restraining removal of the tongues from the spring clips.

6. The structure as defined in claim 4, further characterized in the provision of a flexible welt secured to the lower edge of the cap rear wall, said welt overlying the seam defined by the lower edge of the cap rear wall and the vehicle body.

7. The structure as defined in claim 6, further characterized in that the flexible welt extends around the entire outer peripheral edge of the cap and overlies the seam defined by the other peripheral edge of the cap and the vehicle body.

8. The structure as defined in claim 4, further characterized in that the tongue means includes a raised portion on the inner surface thereof which slides against the vehicle rear window as the cap is mounted on the vehicle and thereby acts to guide the tongue means during said mounting.

* * * * *